(12) United States Patent
Holland

(10) Patent No.: US 8,319,165 B2
(45) Date of Patent: Nov. 27, 2012

(54) VARIABLE RATE CHEMICAL MANAGEMENT FOR AGRICULTURAL LANDSCAPES

(76) Inventor: Kyle H. Holland, Lincoln, NE (US)

( * ) Notice: Subject to any disclaimer, the term of this patent is extended or adjusted under 35 U.S.C. 154(b) by 446 days.

(21) Appl. No.: 12/770,128

(22) Filed: Apr. 29, 2010

(65) Prior Publication Data

US 2010/0222922 A1 Sep. 2, 2010

Related U.S. Application Data

(63) Continuation of application No. 12/167,706, filed on Jul. 3, 2008.

(60) Provisional application No. 60/958,330, filed on Jul. 3, 2007, provisional application No. 61/292,514, filed on Jan. 6, 2010.

(51) Int. Cl.
*G01C 21/02* (2006.01)
*G01C 21/24* (2006.01)

(52) U.S. Cl. ............... 250/206.1; 382/110; 702/2; 702/5

(58) Field of Classification Search ............... 250/206.1; 382/110; 702/2, 5
See application file for complete search history.

(56) References Cited

U.S. PATENT DOCUMENTS

| | | | |
|---|---|---|---|
| 3,443,072 A | 5/1969 | Gibbs |
| 3,910,701 A | 10/1975 | Henderson et al. |
| 4,055,768 A | 10/1977 | Bromberg |
| 4,369,886 A | 1/1983 | Lane et al. |
| 4,518,253 A | 5/1985 | Takahashi |
| 4,628,454 A | 12/1986 | Ito |
| 4,630,773 A | 12/1986 | Ortlip |
| 4,926,170 A | 5/1990 | Beggs et al. |
| 4,986,665 A | 1/1991 | Yamanishi et al. |
| 5,025,150 A | 6/1991 | Oldham et al. |
| 5,144,767 A | 9/1992 | McCloy et al. |
| 5,220,876 A | 6/1993 | Monson et al. |
| 5,296,702 A | 3/1994 | Beck et al. |
| 5,355,815 A | 10/1994 | Monson |
| 5,389,781 A | 2/1995 | Beck |
| 5,585,626 A | 12/1996 | Beck et al. |
| 5,763,873 A | 6/1998 | Beck et al. |
| 5,789,741 A | 8/1998 | Kinter |
| 5,809,440 A | 9/1998 | Beck et al. |
| 5,833,144 A | 11/1998 | Kinter |
| 5,837,997 A | 11/1998 | Beck |
| 6,160,902 A | 12/2000 | Dickson et al. |
| 6,393,927 B1 | 5/2002 | Biggs |
| 6,596,996 B1 | 7/2003 | Stone et al. |
| 6,601,341 B2 | 8/2003 | Raun et al. |

(Continued)

OTHER PUBLICATIONS

Aronson, Milton H., "Low-Level Measurements-8 Lock-in and Carrier Amplifiers", Measurements and Data Corporation, pp. C1-C15.

(Continued)

*Primary Examiner* — Seung C Sohn
(74) *Attorney, Agent, or Firm* — McKee, Voorhees & Sease, P.L.C.

(57) ABSTRACT

An apparatus for applying agrochemicals within a geographical area includes a dispensing system configured for dispensing the agrochemicals and a variable rate controller operatively connected to the dispensing system and configured to control dispensement of agrochemicals from the dispensing system. The variable rate controller is programmed with an algorithm which uses a plant growth stage appropriate plug value for an initial calibration. A method for applying agrochemicals within a geographical area includes acquiring a growth stage appropriate plug value for an initial calibration, using the growth state appropriate plug value in the initial calibration, and applying agrochemicals to the geographical area according to the initial calibration.

41 Claims, 9 Drawing Sheets

U.S. PATENT DOCUMENTS

| | | | |
|---|---|---|---|
| 6,889,620 | B2 | 5/2005 | Fraisse et al. |
| 6,963,881 | B2 | 11/2005 | Pickett et al. |
| 6,999,877 | B1 | 2/2006 | Dyer et al. |
| 7,047,133 | B1 | 5/2006 | Dyer et al. |
| 7,171,912 | B2 | 2/2007 | Fraisse et al. |
| 7,188,450 | B2 | 3/2007 | Raun et al. |
| 2001/0036295 | A1 | 11/2001 | Hendrickson et al. |
| 2004/0119020 | A1 | 6/2004 | Bodkin |

OTHER PUBLICATIONS

Burr-Brown, Applications Handbook. OPT201 Photodiode amplfier rejects ambient light. 1994. AB-061, p. 379.

Gage, S. Evans et al., Optoelectronics Applications Manual, 1977. McGraw-Hill Book Co.

Haggar, R.J. et al., "A Prototype Hand-Held Patch Sprayer for Killing Weeds, Activated by Spectral Difference in Crop/Weed Canopies", Agricultural Research Counsel, Nov. 15, 1982, pp. 349-358.

Haggar, R.J. et al., "Measuring Spectral Differences in Vegetation Canopies by a Reflectance Ratio Meter", Weed Research, 1984 vol. 24, pp. 59-65.

Hooper, A. W. et al., "A Photoelectric Sensor for Distinguishing between Plant Material and Soil" J. Agric. Engng. Res. (1976) 21, pp. 145-155.

Hyder, Dave, "Infrared Sensing and Data Transmission Fundamentals", Industrial Control Applications, Mar. 1991, DL412/D, AN1016, pp. 367-372.

Knipling, E.B., "Physical and Physiological Basis for the Visible and Near-Infrared Radiation from Vegetation", American Elsevier Publishing Company, Inc. 1970, pp. 155-159.

Mcabe, D., "An Eye on Nitrogen", Precision AG, Mar. 2004, pp. 21-23.

Mcabe, D., "Seeing the Light of Nitrogen", Nebraska Farmer, Feb. 1996, pp. 14, 15 and 20.

Motorola "Linear/Interface Devices", MC3346 and MC3373 Datasheets, 1988, pp. 9-42 to 9-46.

Palmer, J. et al., "Automatic Control of Sugar Beet Singling and Thinning by Means of an On-line Digital Computer", J. Agric. Eng. Res., (1971) vol. 16 (2), pp. 107-125.

Ritchie, J.C. et al., "Airborne laser measurements of rangeland canopy cover and distribution", J. Range Manage, Mar. 1992, 45:189-193.

Rsichenberger, Larry, "Tools With Eyes", Farm Journal, Mar. 1989, pp. 16-18.

Searcy, S. W. et al., "Measurement of Agricultural Field Location Using Microwave Frequency Triangulation" Computers and Electronics in Agriculture (1990), vol. 4, pp. 209-233.

Stafford, J. V. et al., "A Portable Infra-red Moisture Meter for Agricultural and Food Materials: Part 1, Instrument Development", J. Agric. Eng. Res. (1989), 43:45-46.

Thompson, J.F. et al., "Potential for Automatic Weed Detection and Selective Herbicide Application", Crop Protection (1991), vol. 10, p. 254-259.

Marvin L. Stone and Mark Zachos, Application of J1939 Networks in Agricultural Equipment, Oklahoma State University Dearborn Group, Stillwater, Oklahoma Farmington Hills, Michigan, http://biosystems.okstate.edu/home/mstone/ag.J1939.htm.

Meyer, G., et al., "Textural Imaging and Discriminant Analysis for Distinguishing Weeds for Spot Spraying", ASAE, 41 (4):1189-1197 (1998).

Meyer, G., et al., "Intensified fuzzy clusters for classifying plant, soil, and residue regions of interest from color images", Computers and Electronics in Agriculture, 42:161-180 (2004).

Meyer, G., et al., "Verification of color vegetation indices for automated crop imaging applications", Computers and Electronics in Agriculture, 63:282-293 (2008).

Woebbecke, D., et al., "Calibration of Large Field of View Therman and Optical Sensors for Plant and Soil Measurements", ASAE, 37(2):669-677 (1994).

Woebbecke, D., et al., "Color Indices for Weed Identification Under Various Soil, Residue, and Lighting Conditions", ASAE, 38(1):259-269 (1995).

Woebbecke, D., et al., "Shape Features for Identifying Young Weeds Using Image Analysis", ASAE, 38(1):271-281 (1995).

VARIABLE RATE CHEMICAL MANAGEMENT FOR AGRICULTURAL LANDSCAPES

PRIORITY STATEMENT

This application is a continuation-in-part of U.S. patent application Ser. No. 12/167,706, filed Jul. 3, 2008, which claims priority to U.S. Provisional Patent Application No. 60/958,330, filed Jul. 3, 2007, both of which are hereby incorporated by reference in their entireties. U.S. patent application Ser. No. 12/167,706, filed Jul. 3, 2008 also claims priority to U.S. Provisional Patent Application No. 61/292,514, filed Jan. 6, 2010, hereby incorporated by reference in its entirety.

FIELD OF THE INVENTION

The present invention relates to variable rate chemical management for agricultural landscapes. More particularly, but not exclusively, the present invention relates to real-time sensor based application of agrochemicals.

BACKGROUND OF THE ART

Various methodologies are available to crop producers which allow them to apply agrochemicals. Some methodologies use real-time active crop sensors for variable rate control of agrochemicals. In a conventional variable rate control system a managed crop reference strip or region in a field is used to calibrate the system. Yet such calibrations may be inconvenient to provide and crop producers may not be willing to perform the steps needed to calibrate.

What is needed are systems and methods that do not use controlled agrochemical regions for calibration and which are simple and convenient for agricultural producers to use while still resulting in application of agrochemicals in acceptable and desirable manners.

SUMMARY OF THE INVENTION

Therefore, it is a primary object, feature, or advantage of the present invention to improve over the state of the art.

It is a further object, feature, or advantage of the present invention to provide for methods and systems for application of agrochemicals which use real-time sensors to assist in the application of the agrochemicals.

It is a still further object, feature, or advantage of the present invention to provide for methods and systems for application of agrochemicals which do not require the use of crop reference strips or regions for calibration purposes.

Another object, feature, or advantage of the present invention is to provide for methods and systems for applications of agrochemicals which allow for users to select the methodology or algorithms to be used.

Yet another object, feature, or advantage of the present invention is to allow a crop producer to variably control rate of application of agrochemicals without driving through at least a portion of the field for calibration purposes.

A still further object, feature, or advantage of the present invention is to use adaptive algorithms for variably controlling the rate of application of agrochemicals within a field.

Yet another object, feature, or advantage of the present invention is to variably control application of more than one agrochemical at a time.

A still further object, feature, or advantage of the present invention is to record and map the application of agrochemicals within a field.

Yet another object, feature, or advantage of the present invention is to permit use of GPS data to assist in the application of agrochemicals within a field.

A further object, feature, or advantage of the present invention is to provide for variable rate control which does not require the use of GPS data.

A still further object, feature, or advantage of the present invention is to provide for variable rate control methodologies which may be used with remote sensing as well as real-time active sensors.

One or more of these and/or other objects, features, or advantages will become apparent from the specification and claims that follow. No single embodiment of the present invention need exhibit each or any of the objects, features, or advantages. The present invention is not to be limited by or to these objects, features, or advantages.

The present invention provides several methods for practicing sensor-based precision farming techniques pertaining to the application of materials such as seeds, fertilizer, pesticides, herbicides or other agricultural substances. In contrast to prior techniques, the preferred embodiment does not utilize a highly fertilized reference area (or controlled agrochemical region whether it be treated with a high or low dose of material) to calibrate the sensing system for application of an agrochemical and thereby eliminates the extra management steps and overhead required by the producer to create, locate and maintain these portions of a field. This advantageous because a major hurdle hindering the adoption of remote sensing technology for variable rate agrochemical application pertains to the requirement of creating a known calibration standard within the field in order to differentially compare measurements obtained for the control section to other non control portions of the field. Growers and spray service providers alike view this method of use limiting since is places extra demands on their operations by requiring intensive management of these control or in-field reference plots/strips. The methods disclosed hereafter teaches a non-reference strip approach to variable-rate agrochemical application that utilizes a random walk through the field, or rather, one or more transects through the field in order to measure crop growth variability resulting from various soil types, drainage, cropping history, mineralization, etc. . . . . Note, a transect can also be only a short distance over a representative portion of a crop that contains the information necessary to calibrate the variable rate application system. Information collected by the measurement instrumentation is then utilized to determine a normalized biomass response function for the entire field. This function can then be utilized in conjunction with a grower's conventional farming practice to optimize application of an agrochemical. Additionally, the methodologies disclosed hereafter are not limited to real-time active sensors but may also be applied to other remote sensing technologies such as aerial and satellite imaging.

According to one aspect of the present invention, an apparatus for applying agrochemicals within a geographical area is provided. The apparatus includes a dispensing system configured for dispensing the agrochemicals and a variable rate controller operatively connected to the dispensing system and configured to control dispensement of agrochemicals from the dispensing system. The variable rate controller is programmed with an algorithm which uses a plant growth stage appropriate plug value for an initial calibration.

According to another aspect of the present invention, a method for applying agrochemicals within a geographical area is provided. The method includes acquiring a growth stage appropriate plug value for an initial calibration, using the growth state appropriate plug value in the initial calibration, and applying agrochemicals to the geographical area according to the initial calibration.

According to another aspect of the present invention, a method for calibrating a system for treating plants growing in a geographical area is provided. The method includes acquiring a growth stage appropriate plug value for an initial calibration, passing an optical sensor over a part of the geographical area, measuring with the sensor a plant growth parameter at a plurality of locations within the geographical area, and analyzing the growth parameter measurements to generate a normalized response function for the geographical area.

According to another aspect of the present invention, a system for treatment of crops is provided. The system includes means for providing spatially variable vegetation index data, means for receiving optimum or economically optimum agrochemical rate data, and means for applying an agrochemical recommendation model to the spatially variable vegetation index data and the optimum or economically optimum agrochemical rate data to provide a recommended rate for treatment of crops.

According to another aspect of the present invention, a system for treatment of crops includes an agricultural machine, an intelligent control operatively connected the agricultural machine, and an agrochemical recommendation model stored on a memory associated with the intelligent control. The agrochemical recommendation model provides for determining a recommended rate for treatment of crops using spatially variable vegetation index data and optimum or economically optimum agrochemical rate data.

According to another aspect of the present invention, a method for treatment of a crop includes receiving optimum or economically optimum agrochemical rate data, receiving spatially variable vegetation index data, applying an agrochemical recommendation model to determine an agrochemical recommendation for application of an agrochemical, and applying the agrochemical to the crop.

DETAILED DESCRIPTION

Overview

Variable rate application (VRA) of agrochemicals is an important in various types of crop production including row crops such as, but not limited to, corn, soybeans, cotton, and sorghum. The use of VRA is advantageous because it reduces the amount of unnecessary application of agrochemicals, reduces the likelihood of under application of agrochemicals and thus there are economic as well as environmental advantages to using variable rate application of agrochemicals instead of a fixed rate. The various methods, apparatus, and systems of the present invention allow for effective application of agrochemicals in a manner that is simple for crop producers to implement.

FIG. 1A to FIG. 1H illustrate different embodiments of an apparatus of the present invention. It is to be understood that no single embodiment need include all of the components shown in any of these figures. It is to be further understood that the present invention allows for components from different figures to be combined in a particular embodiment.

Figure 1A:
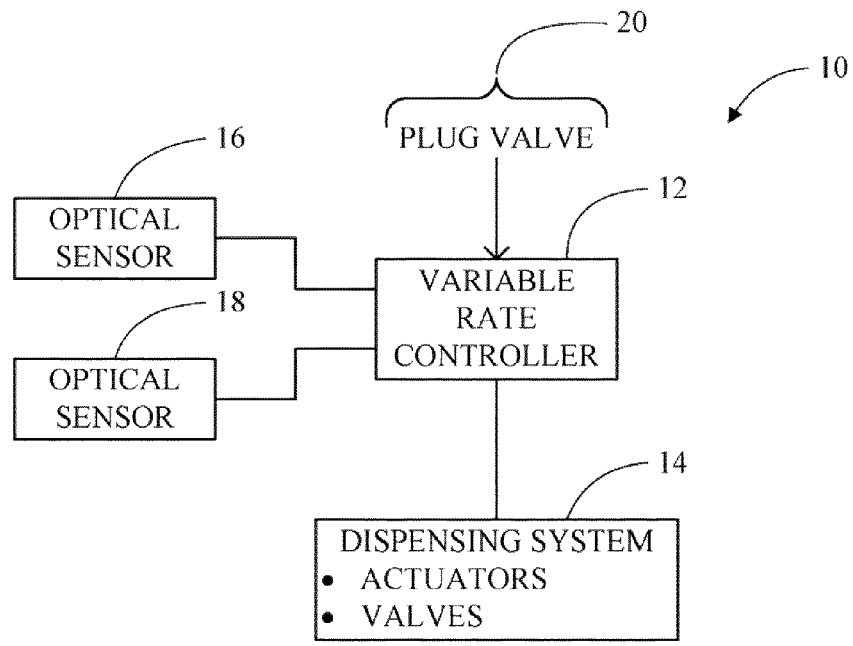
FIGS. 1A-1H illustrate various embodiments of apparatus and systems of the present invention.

In FIG. 1A a system 10 includes a variable rate controller 12. A dispensing system 14 is operatively connected to the variable rate controller 12 and the variable rate controller 12 is configured to control the dispensing system 14. The dispensing system 14 is configured to dispense an agrochemical and may use actuators, valves, or other components to do so. Also in system 10, an optical sensor 16 and an optical sensor 18 are operatively connected to the variable rate controller 12. Although two optical sensors are shown, the present invention contemplates more or fewer sensors being used. The variable rate controller 12 receives a plug value 20. The plug value 20 may be hard coded, user specified, or otherwise determined. The plug value 20 may be downloadable or definable by the user. The plug value 20 is used in at least initial calibration of the system. The present invention contemplates that the system does not need further calibrations from a user after the initial calibration and can adjust based on measurements using the optical sensors 16, 18. The optical sensor 16 may be used for sensing plant growth parameters and the optical sensor 18 may be used for sensing soil color parameters. Of course, different configurations of sensors may be used and different types of sensors. For example, the soil sensors may be electromagnetic, electrochemical, optical, or force sensors.

Note that in such an embodiment, a user need only provide the initial calibration or information to be used in determining the initial calibration. There is no need for calibrating to test strips or regions.

Figure 1B:
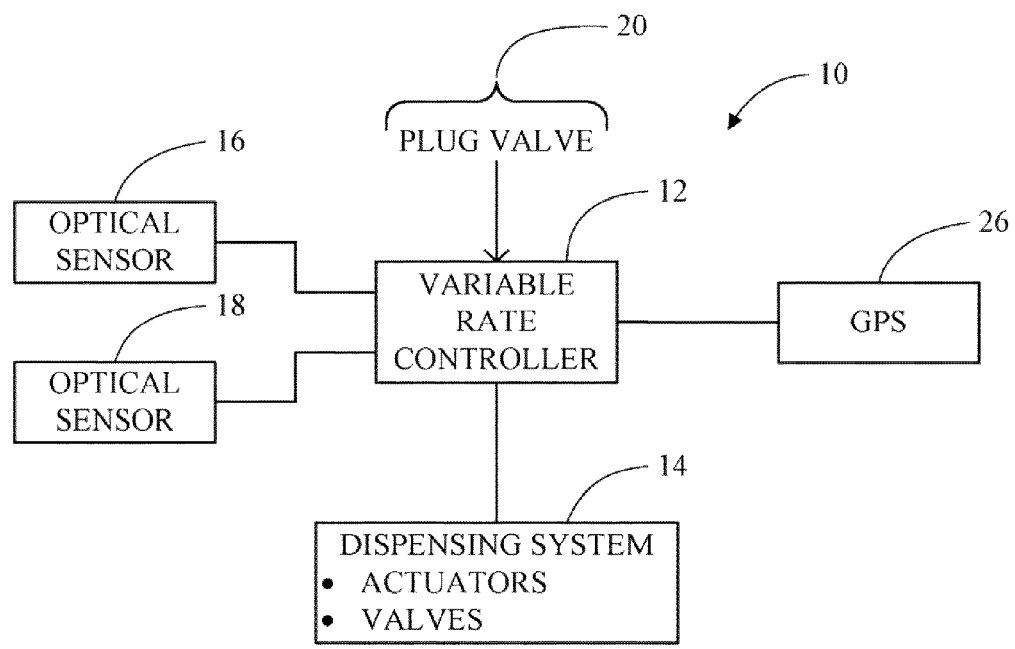

In FIG. 1B, a GPS receiver 26 is operatively connected to the variable rate controller to provide geoposition information. The variable rate controller may use information from the GPS 26 in an algorithm to assist in determining application of agrochemicals. For example, there may less application of agrochemicals at locations within a field having a high and low elevations and more application to intermediate elevations as various models for determining application rate may take into account movement of agrochemicals due to water movement.

Figure 1C:
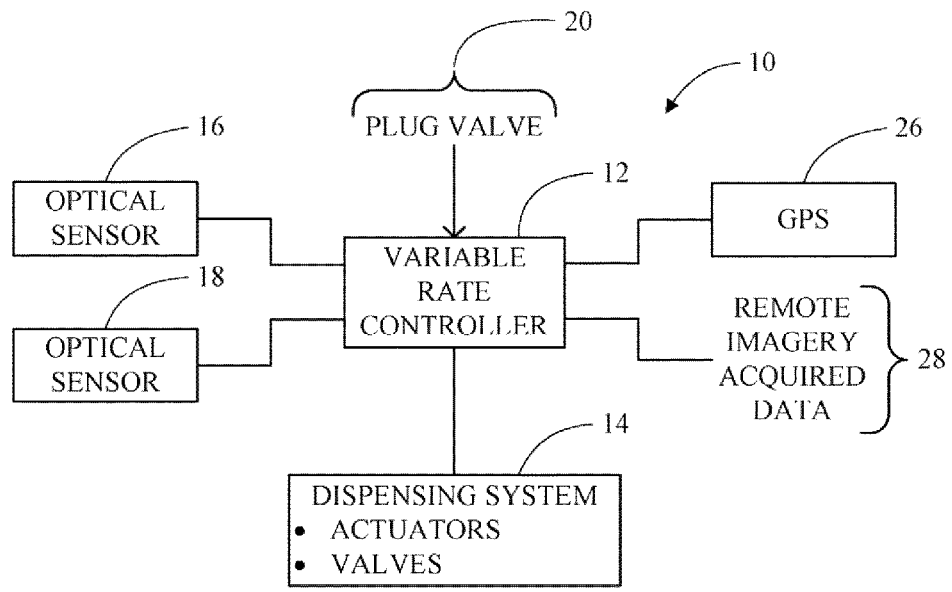

In FIG. 1C, remote imagery acquired data 28 is provided to the variable rate controller 12. The present invention contemplates that instead of or in addition to using optical sensors or other crop sensors for sensing vegetative state of a crop, this information may be acquired from remote sensing data.

Figure 1D:
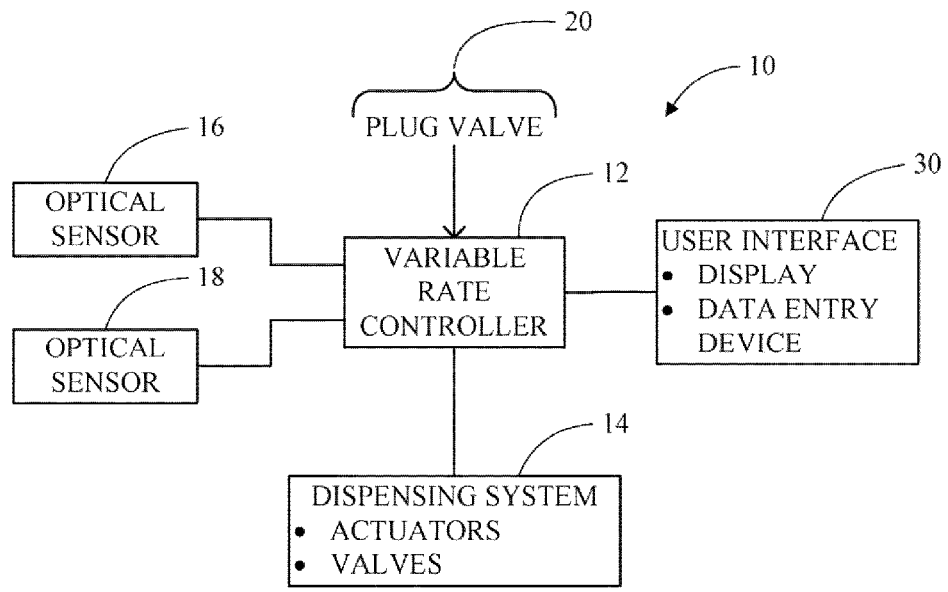

In FIG. 1D, a user interface 30 is operatively connected to the variable rate controller 12. The user interface 30 may include a display and a data entry device. The user interface 30 may be used by a crop producer or other user to specify a particular algorithm to use, to manually enter (define) an algorithm to use or to input plug values.

Figure 1E:
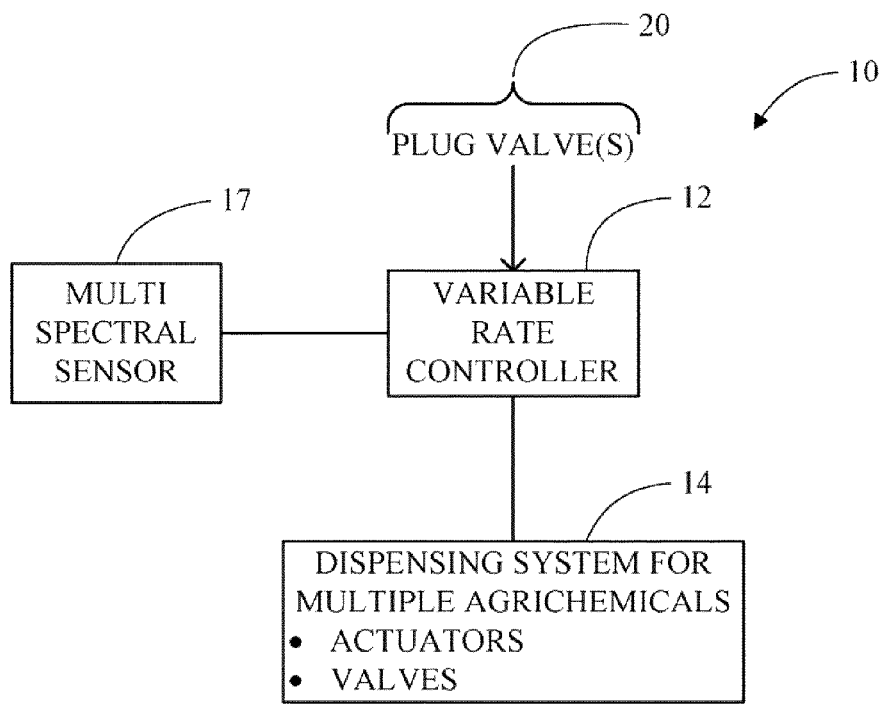

In FIG. 1E, a multispectral sensor 17 is operatively connected to the variable rate controller 12. In this embodiment, the dispensing system 14 may also be configured to dispense multiple types of agrochemicals.

Figure 1F:
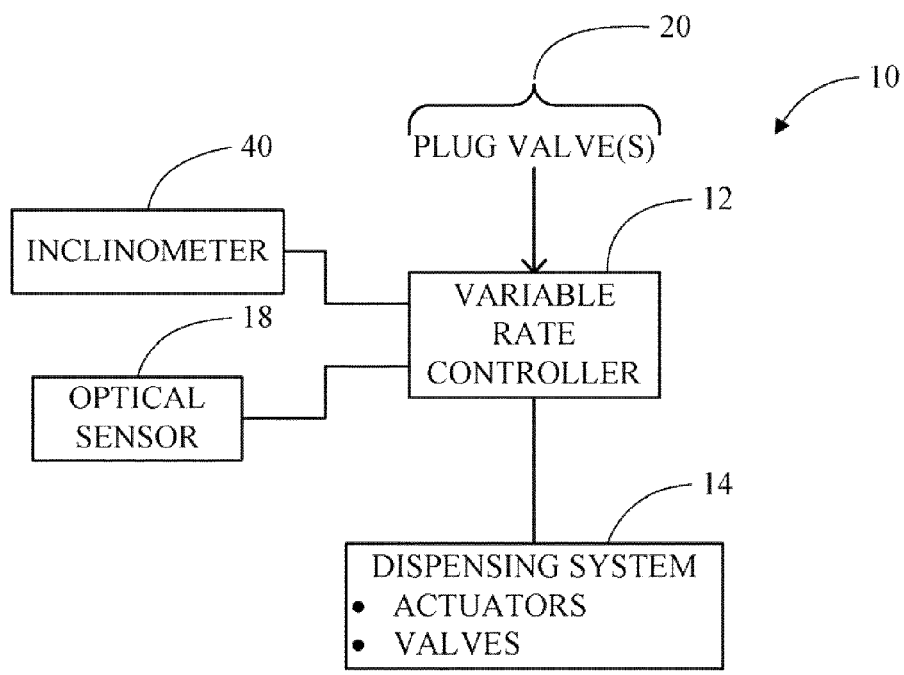

In FIG. 1F, an inclinometer 40 is operatively connected to the variable rate controller 12. In this embodiment the variable rate controller 12 uses an algorithm which is configured to take into account incline data when calculating application rates. In such an embodiment GPS altitude data need not be used but in other circumstance both GPS and inclinometer may be used to supplement data produced by each.

Figure 1G:
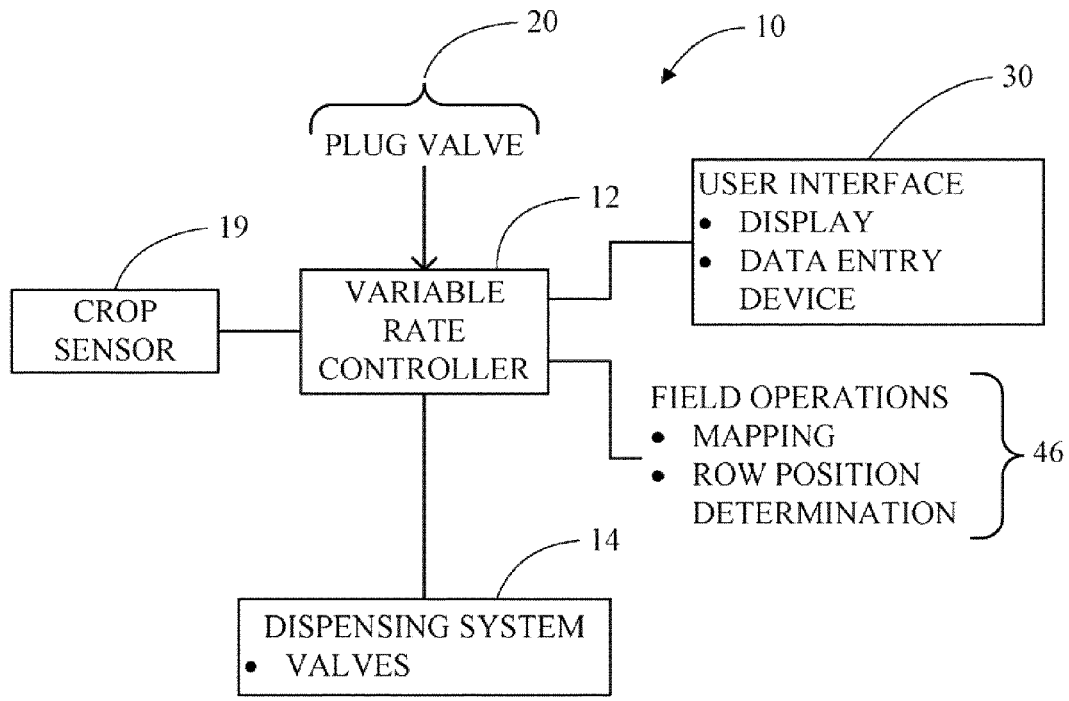

In FIG. 1G, a crop sensor is operatively connected to the variable rate controller 12. The crop sensor may be an optical sensor or other type of sensor. Also shown in FIG. 1G, the variable rate controller 12 may determine additional field operations in addition to dispensing rate. These may include mapping of the application of agrochemicals, row position determination, or other types of field operations.

Figure 1H:
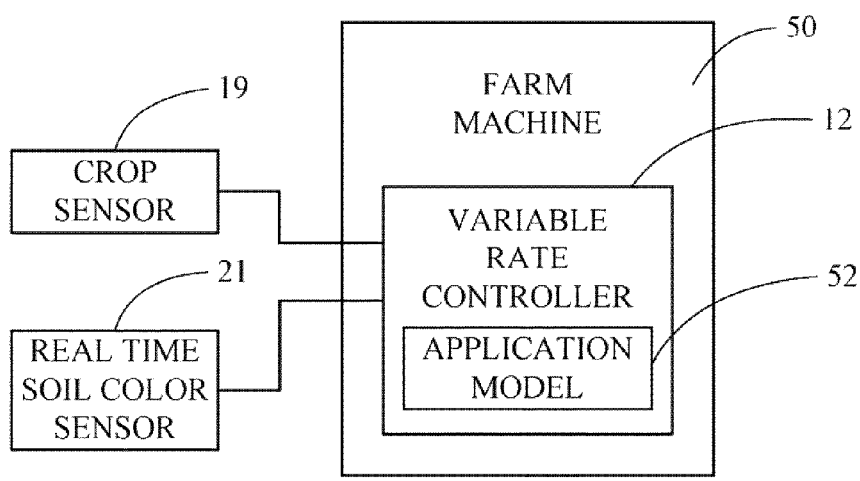

In FIG. 1H, the variable rate controller 12 is shown as part of a farm machine 50. An application model 52 is stored on a machine readable storage medium associated with the variable rate controller 12. A crop sensor 19 and a real-time soil color sensor 21 are operatively connected to the variable rate controller 12.

From these examples, it should be apparent that the present invention provides for variable application of agrochemicals to be performed in various ways using different types of sensors and different types of algorithms or models.

Plug Value with N Fertilizer

A primary agrochemical requiring intensive management for numerous crops is N fertilizer. For purposes of illustration, we will describe our method utilizing N fertilizer as the managed agrochemical, however, it will be apparent to those skilled in the art that the principles described for fertilizer application can be applied to other agrochemicals or materials.

Regarding the background science behind crop N status monitoring, it has been shown that the positive relationship between leaf greenness and crop nitrogen (N) status will allow the determination crop N requirements based on reflectance data collected from the crop canopy (Walberg et al., 1982; Girardin et al., 1985; Hinzman et al., 1986; Dwyer et al., 1991) and leaves (McMurtrey et al., 1994). Plants with increased levels of N typically have more chlorophyll (Inada, 1965; Rodolfo and Peregrina, 1962; Al-Abbas et al., 1974; Wolfe et al., 1988) and greater rates of photosynthesis (Sinclair and Horie, 1989). Hence, plants that appear a darker green are perceived to be healthier than N deficient plants. Chlorophyll in leaves absorbs strongly in the blue and red regions of the spectrum (460 nm and 670 nm) and reflects/transmits light in the green region (550 nm). Blackmer et al. (1994a,b,c) used a spectroradiometer to characterize the differences in light reflected from corn canopies receiving different N treatments. They found a strong relationship between green light (550 nm) and fertilizer N rate. In addition, green light reflectance from corn during the late milk stage (R4 to R5) was highly correlated with grain yield ($r^2$=0.98, ten N rates for one hybrid). As a result, it is the relationship between leaf greenness (reflected green light) and chlorophyll content (absorbance) which makes it possible to remotely sense or measure leaf greenness and obtain an indication of chlorophyll concentration and plant N status.

Adoption of automated N management practices will require methodologies that impact their current farming practices minimally. Recently there has been a trend in the United States by growers to apply nitrogen via split application, that is, some of the N is applied at planting time and the remainder is applied during the growing season when the crop is most responsive to nutrient. In other situations, N is applied in multiple doses during the growing season such as in European wheat and barley crops. Here, N in these cropping systems is applied at regular intervals to achieve certain biomass goals. Both split and dosage application farming practices can benefit from the agrochemical management methodology presented herein. Cotton is another crop that will benefit from this method. Both growth regulators and defoliants are applied in-season on cotton crops. With application of growth regulators, the goal is to achieve a uniform biomass throughout a field and use of a real-time sensing system controlled with the application methodology presented here will greatly benefit cotton growers.

In the most general sense, the real-time non-reference strip variable rate application equation can be defined as follows:

$$S_{Rate} = k \cdot (S_{App} + G \cdot f(\alpha)) \quad (1)$$

Where $S_{Rate}$ is the desired real-time rate of application for the agrochemical, $S_{App}$ is the producer's conventional application rate for the agrochemical, G is the crop growth rate response constant, $f(\alpha)$ is the general biomass sensitivity function or growth function, k is a zone factor scalar (0<k<2), and $\alpha$ is the normalized biomass sensitivity variable.

The functional form of the real-time equation 1 allows a grower to set a typical in-season application rate for his agrochemical $S_{App}$. This may be a standard side-dress rate or some other split application or dosage rate. Modification of this in-season rate due to crop variability is performed via the sensor-controlled term, $G \cdot f(\alpha)$. Because soil types and field conditions across an agricultural landscape can vary substantially, zone factor k has been included in equation 1 to allow for spatial scaling of the rate equation. For example, consider a corn field. In some soil regions of the field, soil fertility may be very low and no matter how much N is applied, there will not be a commensurate increase in yield. In this situation, the factor k may be assigned a value of 0.25 in order to conserve N in this part of the field. The purpose of the zone factor is to either increase or decrease the overall rate amount to account for landscape variability in the field due to soil types, topology, soil chemistry, drainage, organic matter, etc. . . . . This zone factor is typically utilized when additional geospatial information (for example soil maps, yield maps, biomass maps, soil sample) are incorporated into the variable rate system to account for highly productive or non productive regions of the field. When the VRA system is operated in real-time and not utilizing other geospatial data, the zone factor is ignored by setting its value equal to 1.0. Zone factor k can also be determined in real-time through the use of a soil sensor. This soil sensor can be either a conductivity sensor that is pulled through or over the soil, optical in situ soil sensor or a reflectance sensor such as disclosed in U.S. patent application Ser. No. 10/703,256. Measurements collected by these sensors can be utilized in conjunction with a look-up table or equation to generate values for the zone coefficient k. Furthermore, zone factor k can also be split into zone factors k1 and k2 where k1 modifies only $S_{App}$ and k2 modifies $G \cdot f(\alpha)$. This gives the application rate method additional flexibility in situations when either the grower application rate or the sensor application rate is to modified or shut down independently with respect to the other.

Additionally, $\alpha$ may be further defined as:

$$\alpha = \frac{VI_{Field} - VI_{Ref}}{VI_{Max} - VI_{Min}} \quad (2)$$

Where
- $VI_{Field}$ is the real-time vegetation index information measured via remote sensing,
- $VI_{Ref}$ is a statistical measure of the crop canopy which may include maximum, minimum, average, etc. . . . vegetation index values,
- $VI_{Max}$ is the maximum value of the vegetation index of the scanned field, and
- $VI_{Min}$ is the minimum value of the vegetation index of the scanned field.

The function variable α is utilized by the method presented in this work to characterize the crop variability and to control the range (bound) of numeric values that the sensed crop data will assume for rate processing. This method essentially reduces the system's sensitivity to absolute sensor calibrations via normalization. The use of ratios, differences or combinations of both when defining α will greatly reduce errors associated with sensor drift and offset. The vegetative bounds $VI_{Max}$ and $VI_{Min}$ can be determined by any number of means which may include maximum and minimum detection, histogram acquisition/analysis, standard deviation from mean, etc. . . . . Additionally, the $VI_{Ref}$ term may be either $VI_{Avg}$, $VI_{Max}$ or $VI_{Min}$ or some other statistically determined value extracted from remotely sensed field data, for example, an average, a weighted mean, probability distribution, etc. In some circumstances, $VI_{Ref}$ could be predetermined from previously acquired sensor data or set by a variable rate controller's software (hard coded) but in either case, one can consider these values for $VI_{Ref}$ as "plug value(s)" that help establish the response function with respect to sampled field data. The advantage of using plug values in the variable rate control system is to assist in calibrating the growth response function model of the plant and to allow the system to immediately applying agrochemicals without the need of driving one or more transects through the field. The plug values are vegetative indexes that are often measured at various growth stages so as to account for growth related biophysical properties. Plug values can be collected regionally or locally that is by region of state or region of country for a particular type of crop. The plug values are processed to give a best first guess for $VI_{ref}$. This method can be used alone or with an adaptive trimming (statistical determination) technique that will be described later. Table 1 shows, for illustration purposes, how plug values can be utilized when associated with growth stage; corn is utilized as the example crop in the table but other crops and there growth stage information can be similarly utilized.

TABLE 1

Look up table for $VI_{Ref}$ plug values
based on crop growth stage (corn)

| Crop Growth Stage | Crop Plug Value for VIref (NDRE) |
| --- | --- |
| V6 | 0.350 |
| V7 | 0.405 |
| V8 | 0.455 |
| V9 | 0.512 |
| V10 | 0.623 |
| V11 | 0.681 |
| V12 | 0.753 |

Values from the table may be read and loaded into the controller's VRA algorithm and utilized as the $VI_{ref}$ value in the crop growth response function.

Figure 3:
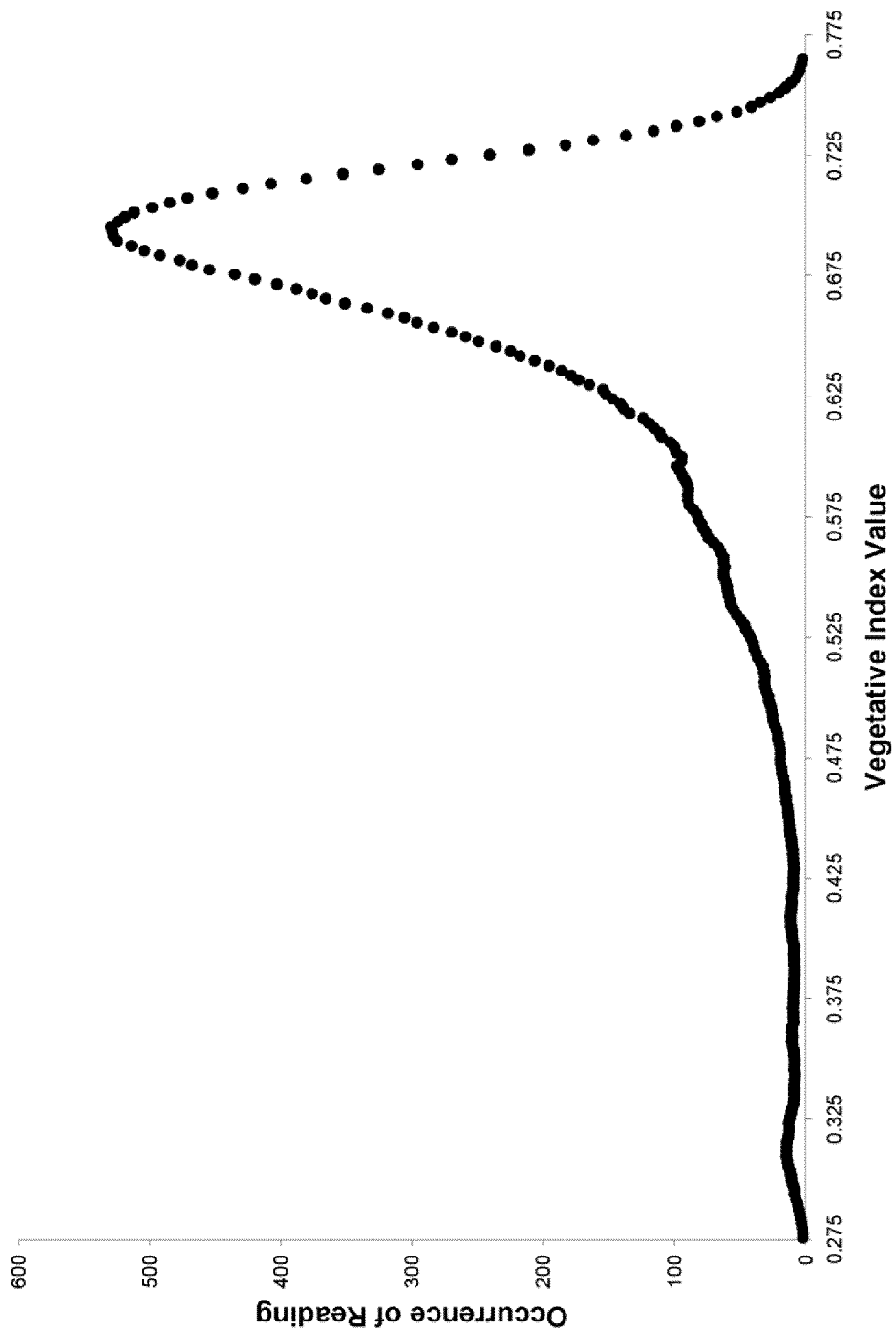
FIG. 3 is a histogram of vegetative index data collected during a scan partial scan of a field crop.

With regard to determining the statistical vegetative index values for sampled field data, one convenient method would be to analyze the histogram of sampled data. FIG. 3 shows a histogram of data collected from a corn field. The data can be first smoothed using a moving average filter other digital signal processing technique in order to determine the data distribution's maximum value. In some cases, this maximum value can serve as the data set's $VI_{Ref}$ 20. In other cases the $VI_{Ref}$ may be determined from the average VI value and the standard deviation of the sampled data. For example, $VI_{Ref}$ may be set to equal the average VI value of the sampled data plus two standard deviations or roughly 95% of the sampled data or mathematically stated, $VI_{Avg}+2\cdot\sigma$ and more generally $VI_{Ref}$ may be mathematically stated as $VI_{Avg}+n\cdot\sigma$, where n is a number greater than 0. As will be apparent to one skilled in the art, there are numerous other statistical and mathematical determinations which may be calculated in order to set the value of $VI_{Ref}$ from the sampled data in addition to the aforementioned method. Continuing on, determinations of $VI_{Max}$ 21 and $VI_{Min}$ can be made by analyzing the smoothed data set for values that are 10 to 15% of the peak value or any other arbitrary or predetermined percentage. Furthermore, the maximum and minimum bounds may be determined by first determining $VI_{Max}$ using a predetermined percentage of the peak value and then determining the minimum using the following relationship:

$$VI_{min} = VI_{Ref} - (VI_{Max} - VI_{Ref}) \quad (3)$$

The boundary determination technique in equation 3 will result in maximum and minimum values for equation 2 that are equidistance from $VI_{Ref}$. Additionally, a more basic form of α may be determined in the equation below:

$$\alpha = \frac{VI_{Field}}{b \cdot VI_{Ref}} \quad (4)$$

Where
- $VI_{Field}$ is the real-time vegetation index information measured via remote sensing,
- $VI_{Ref}$ is a statistical measure of the crop canopy which may include maximum, minimum, average, etc. . . . vegetation index values, and
- b is a scalar (0<b<2), when b=1 then the ratio in (4) is sometimes referred to as a sufficiency index.

The simplified form of α in equation 4 is simply the ratio of a measured portion of the field to a sampled portion of the field (b=1). Values for α will pivot around unity. Low biomass values will span from 0 to unity and high biomass ratios will have values exceeding unit. Also note, the ratio in 4 can easily be reciprocated, as well as any form of α previously described, and similar equal or similar results obtained without deviation from the intent of the methodology disclosed. Here the statistical value of $VI_{Ref}$ would be scaled via scalar b to set the artificial reference value, for example, if b were set to a value of 1.25 and $VI_{Ref}$ represented the field average for a given vegetative index, the reference value would be 25% greater than the field average. Another way to define $VI_{Ref}$ is scale the maximum occurrence obtained from a histogram created from sampled data. To do so, one would establish threshold value (defined either by the mean occurrence of the histogram or by some other rule) and search for the first occurrence (starting from the highest bin downward) that exceeds this threshold. As will be apparent to one skilled in the art, there are many methods that can be applied to create reference values from sampled data. In examples above, the scaled magnitude of $VI_{Ref}$ or sample determined $VI_{Ref}$ are similar to the $VI_{Ref}$ value that one would obtain from the ideal reference strip concept.

The $VI_{Ref}$, or rather, the calibration value for the sensor system that is produced by all of the aforementioned methods can be referred to as a "pseudo reference strip" or "virtual reference strip". This value would then be utilized by agrochemical application algorithm to establish the maximum biomass value for field operations or establishing the reference point that a growth response function will be calibrated too. It will be readily apparent to one skilled in the art, that this scaling technique and other scaling methods can be utilized to artificially set field reference values independently of an actual producer-created reference strip in an agricultural landscape. Table 2 demonstrates these concepts. The data in table was collected by driving three random transects through a field. A virtual reference strip value was determine for each sample run through the field and compared statistically to a physical high N reference strip. As one can see form the table, the methodology works quite well.

TABLE 2

Virtual reference strip test for corn using method defined in Equation 4.

| VRS Sample Run | VRS (NDVI) | Error Ref (%) |
|---|---|---|
| 1 | 0.7515 | 0.33 |
| 2 | 0.7380 | −1.47 |
| 3 | 0.7515 | 0.33 |
| 4 | 0.7470 | −0.27 |
| 5 | 0.7470 | −0.27 |
| 6 | 0.7380 | −1.47 |
| 7 | 0.7515 | 0.33 |
| 8 | 0.7425 | −0.87 |
| 9 | 0.7245 | −3.27 |
| 10 | 0.7335 | −2.07 |
| 11 | 0.7380 | −1.47 |
| 12 | 0.7335 | −2.07 |
| 13 | 0.7515 | 0.33 |
| Average VRS | 0.7422 | |
| Physical N Ref Strip | 0.7490 | |

A unique adaptive technique can be created by combining the plug value method with the real time statistical methods discussed above. As mentioned above, a strength of using a plug value to calibrate the variable rate system is that the sprayer operator can immediately start applying agrochemicals when he enters a field. However, if the plug value is not accurate with respect to the "real" field reference value, the applicator system might under or over apply the agrochemical. As such, combining the plug value techniques with an adaptive statistical technique, the reference value can be tuned in real time while the system is applying agrochemicals. This allows the operator to immediately start applying chemicals with a first best guess at $VI_{Ref}$, that is, with a plug value, while the system continually determines a better or more optimum value for $VI_{Ref}$ in the background while the application process is underway. There are various methods and techniques to integrate the two approaches. One involves using a simple threshold test. For instance, if the current sampled reference value is greater than the hard coded (plug value) reference value then substitute the current sampled value in for the hard coded reference value. The current sampled reference value can be obtained from the histogram or from any other statistical type of real-time sensor data analysis. An algorithm that demonstrates this is listed below:

```
//Variable declarations
    float sampled_value; // sampled _value is the statistically processed
        VIref that will be compared to the plug_value VIref.
    float VIref; //VIref is the reference value utilized by VRA plant
growth response function
    float plug_value; //plug value is set during initialization and is loaded
        into VIref
    .
    .
    .
    //test for preferred reference condition in VRA algorithm in the
controller's software
    if (sampled _value > plug_value)
        VIref = sampled_value;
    else
        VIref=plug_value;
    .
    .
    .
```

Other methods to switch from the hardcoded (plug value) $VI_{Ref}$ value to the real-time sampled $VI_{Ref}$ include the use of weighted averages, convergence methods, comparison test, ratio tests, limit methods, etc. It will be readily apparent to one skilled in the art, that there are numerous mathematical and statistical techniques that can be utilized to determine the field reference value based on hardcoded data, statistically sampled/analyzed data or combinations of both to create a reference value independently of an actual producer-created reference strip in an agricultural landscape.

Figure 2:
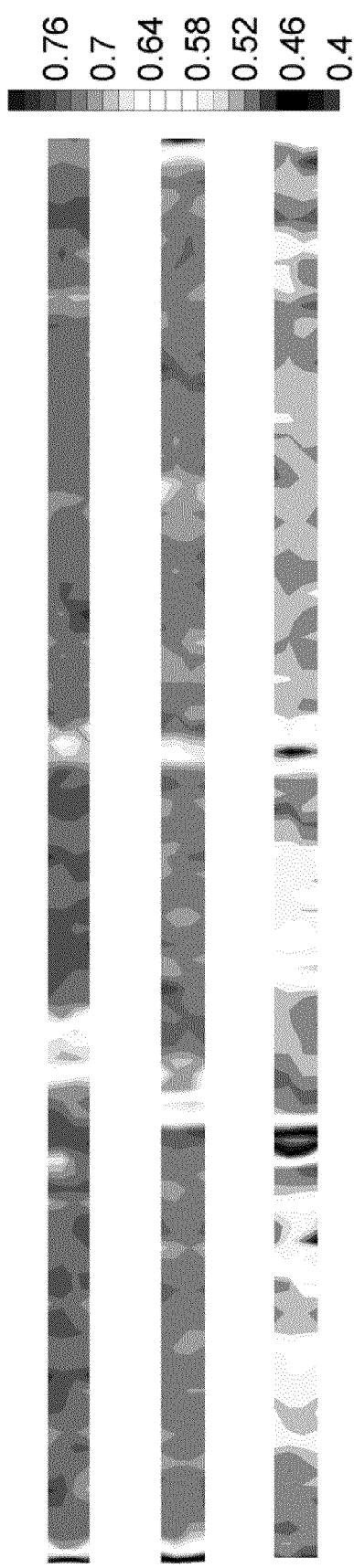
FIG. 2 illustrates amber NDVI values from active crop canopy sensor on at V10 growth stage for three adjacent 12-row corn strips receiving 0, 84, or 252 kg N/ha shortly before planting.

Furthermore, growth function $f(\alpha)$ may be defined to provide the applicator system with a customized response to changing vegetation biomass or crop stress. The function may be tailored so as to model the growth behavior of the plant in general or at a specific time in its growth cycle. For example, $f(\alpha)$ may simply be the variable $\alpha$ times a scale constant G, a piecewise continuous (or discontinuous) function, a look up table, or other curvilinear function (polynomial, sigmoid, etc. ... ). In the case of a scale constant G, the variable $\alpha$ is related to an agrochemical rate proportional to changes in crop biomass. Also, $f(\alpha)$ might also be a generalized plant growth response function. This function can be manipulated so that the terms of the function are parameterized in terms of optimum nitrogen use and sensor values. For example, assume the shape of the curve in FIG. 2 can be described using a $2^{nd}$ order polynomial and can be stated mathematically as $$SI = a_2 \cdot N^2 + a_1 \cdot N + a_0$$

where
SI is the sufficiency index, $VI_{field}/VI_{Ref}$,
$a_0$, $a_1$, $a_2$ are polynomial coefficients, and
N is the applied nitrogen rate in lbs/ac or kg/ha.

The relation above can be simplified and solved for the nitrogen application amount in terms of SI and optimum nitrogen. Doing so results in the following general nitrogen application equation for plant shown below.

$$N_{APP} = \sqrt{\frac{N_{OPT}^2}{\Delta SI} \cdot (1 - SI)}$$

For a more detailed discussion regarding derivation of the above equation please see Holland and Schepers (2009) (in press)).

Figure 4:
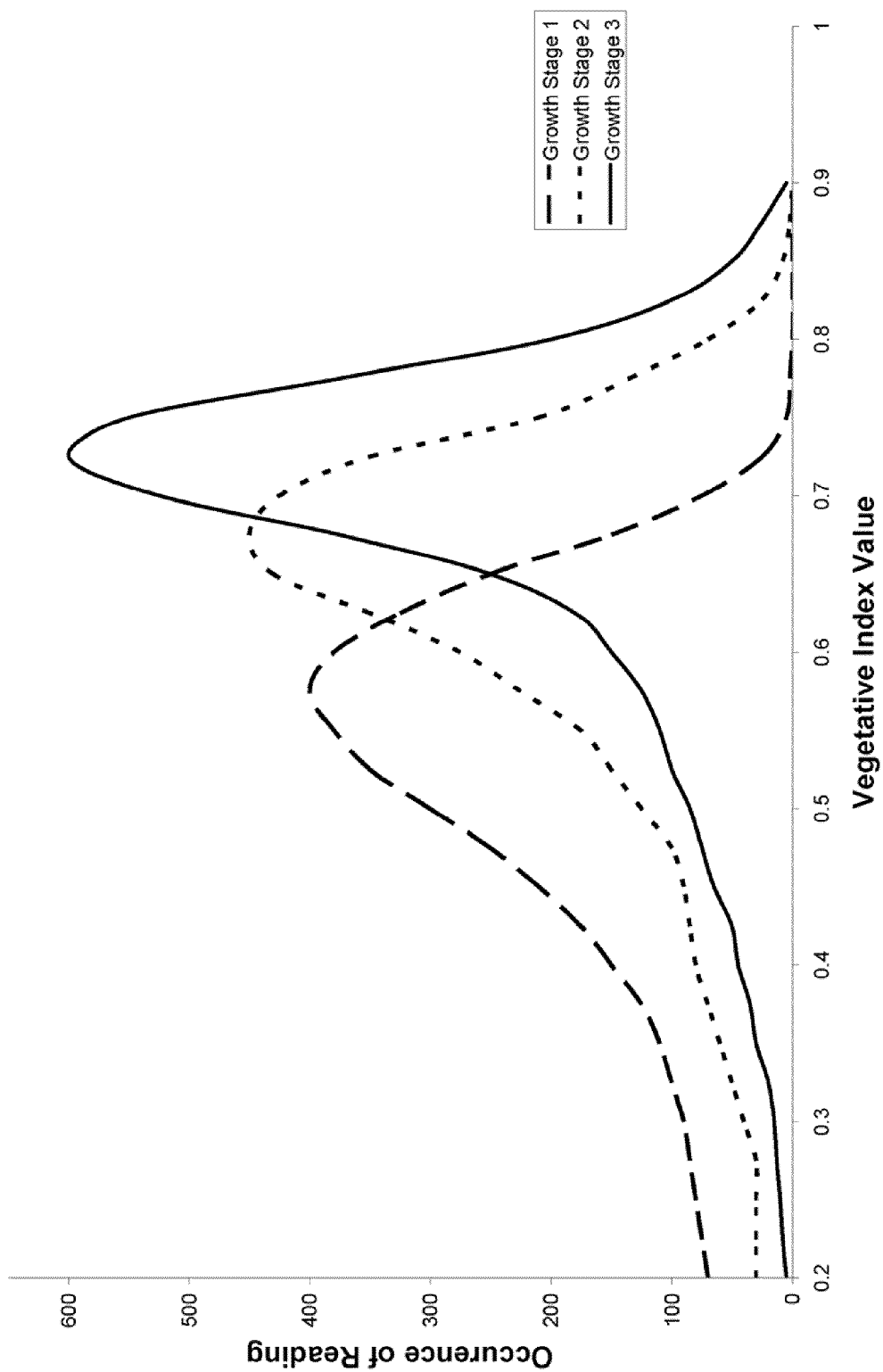
FIG. 4 provides histograms for field crop collected at three different growth stages.

Additionally, the sampled average vegetative index value (assigned to $VI_{Ref}$) can be utilized by the system to automatically determine the nature or shape of $f(\alpha)$. FIG. 4 shows three histograms taking at different stages of crop growth. The peak occurrences for each of the three curves can be utilized as pointers in a table to select the appropriate growth function, $f(\alpha)$, see Table 3 below. Since the crop will accumulate biomass as it grows and this in turn is indicative of the crop growth stage, the system can use this sampled vegetative index value (or peak occurrence) to estimate the age of the crop and select the appropriate growth related equation from a table of functions. Or, $f(\alpha)$ can be derived to respond to this parameter so as to compensate for the changing physiological needs of the plant due to it growth status. By automatically determining the appropriate growth model, the requirement of the operator to enter data regarding growth stage of the crop is eliminated and embeds this information in the variable rate control system subsequently simplifying use of the system by the operator. It will be readily apparent to one skilled in the art, that there are other analysis techniques that can be utilized to automatically classify data in order to select the growth function, $f(\alpha)$, based on sampled crop data including peak occurrence amplitude detection, centroid analysis, first derivative analysis, etc. . . . . .

TABLE 3

Example look up table for selecting crop growth stage based on average biomass readings.

| Mean Crop NDVI | Crop Growth Stage Model |
|---|---|
| 0 < AVG NDVI < 0.60 | $f_1(\alpha)$ |
| 0.60 < AVG NDVI < 0.70 | $f_2(\alpha)$ |
| AVG NDVI > 0.70 | $f_3(\alpha)$ |

Another variation of $\alpha$ relates to the plants physiological response to an agrochemical with respect to a change in a vegetative index. This form of $\alpha$ is defined as:

$$\alpha = \frac{\partial W}{\partial VI} \cdot [VI_{Field} - VI_{Ref}] \quad (5)$$

Where $\frac{\pm \partial W}{\partial VI}$ is the change in the plants growth response with respect to a change in vegetative index VI, $VI_{Field}$ is the real-time vegetation index information measured via remote sensing, and $VI_{Ref}$ is a statistical measure of the crop canopy which may include maximum, minimum, average, etc. . . . vegetation index values.

The variable $\alpha$ in equation 5 may be multiplied by a scalar G which relates the amount of agrochemical to apply per accumulated biomass. The differential in equation 5 can easily be scaled to yield other physiological growth changes per unit vegetative index value. It should also be stated that the vegetative index in equations 2 and 5 is preferably a vegetative index that has good linearity over the range of biomasses or plant stresses that are being monitored. Vegetative indices that are usable include, but not limited too, normalized difference vegetative index (NDVI), (simple ratio index) SRI, chlorophyll index, etc. . . . . Additionally, as will be apparent to one skilled in the art, the function a may be derived to have other functional forms which will result in similar normalized mathematical behavior as equations 2 and 5.

EXAMPLES OF USE

The following examples demonstrate how the algorithm can be utilized in typical agricultural VRA operations. As will be apparent to one skilled in the art, the following examples are not exhaustive in extent, but rather, show some typical applications of the sensor-based management method disclosed. The use of other precision agricultural technologies can be incorporated in the general VRA system to further enhance its performance such as the use of GPS, auto steer, auto guide, light bar technologies and other features or technologies. These technologies can help maintain optimal sensor position over a crop row which will aid in sensing crop information.

There numerous other modifications and implementations which that are possible while remaining within the scope of the methodology disclosed.

Example 1

Figure 5:
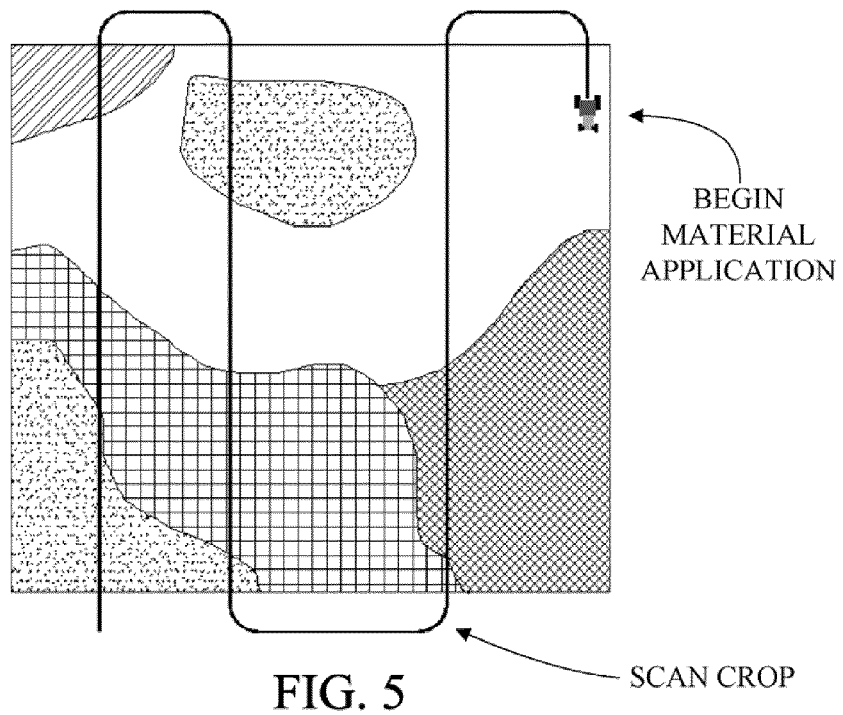
FIG. 5 illustrates sensor-based variable rate application utilizing random field sampling for sensor calibration.

A grower decides to variably apply nitrogen to a field. He decides to apply 100 kg/ha on average and that his maximum and minimum rates should be 50 and 150 kg/ha, respectively. These parameters are loaded into the variable rate controller located inside his tractor. Next, the grower drives several transect through his field to collect crop growth information, see FIG. 5. Note, the coefficients in equation 1 become: $S_{App}$ equal 100 kg/ha, G equal 50 kg/ha, k equal 1.0 and for simplicity function $f(\alpha)$ is the function argument $\alpha$, equation 2, (normally $f(\alpha)$ would be a curvilinear function that would characterize the growth behavior of the crop). The parameters for the variable $\alpha$ are determined via the transects through the field and will be bounded so as to produce a range of values between −0.5 and 0.5 around the field average. Equation 1 is now has the following form:

$$S_{Rate} = 100 + 50 \cdot \alpha \quad (6)$$

He then proceeds to drive the field and apply nitrogen to his crop. At the sensing extremes, the applicator system will apply 150 kg/ha to the low biomass portions of the field and 50 kg to the high biomass portions of the field.

Example 2

Figure 6:
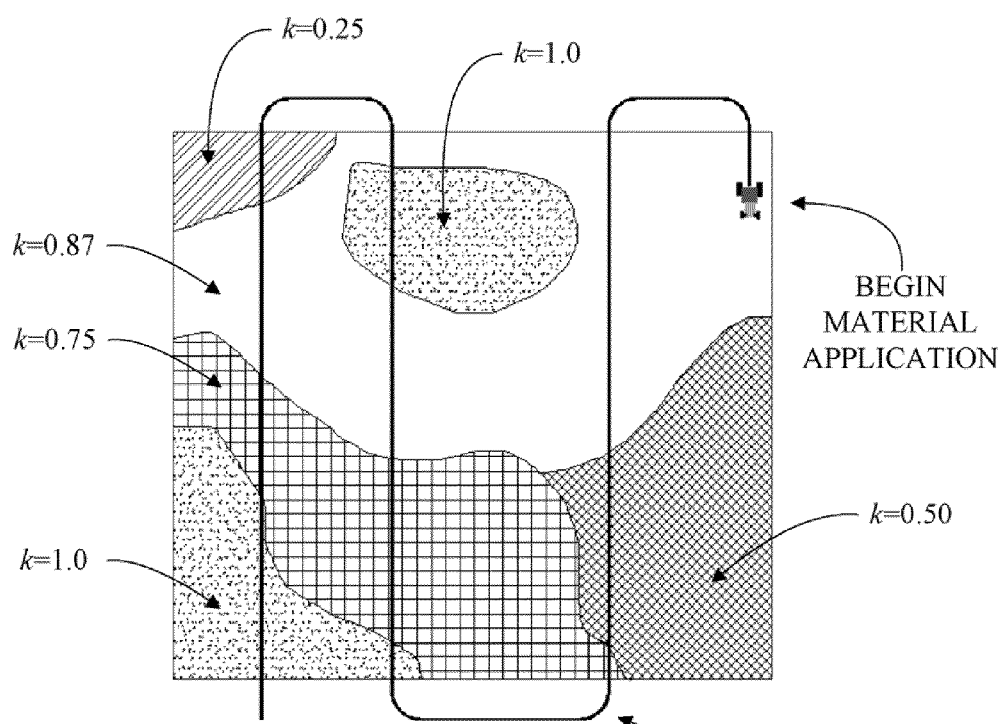
FIG. 6 illustrates a VRA system with real-time crop sensors and real-time soil color sensor.
Figure 7:
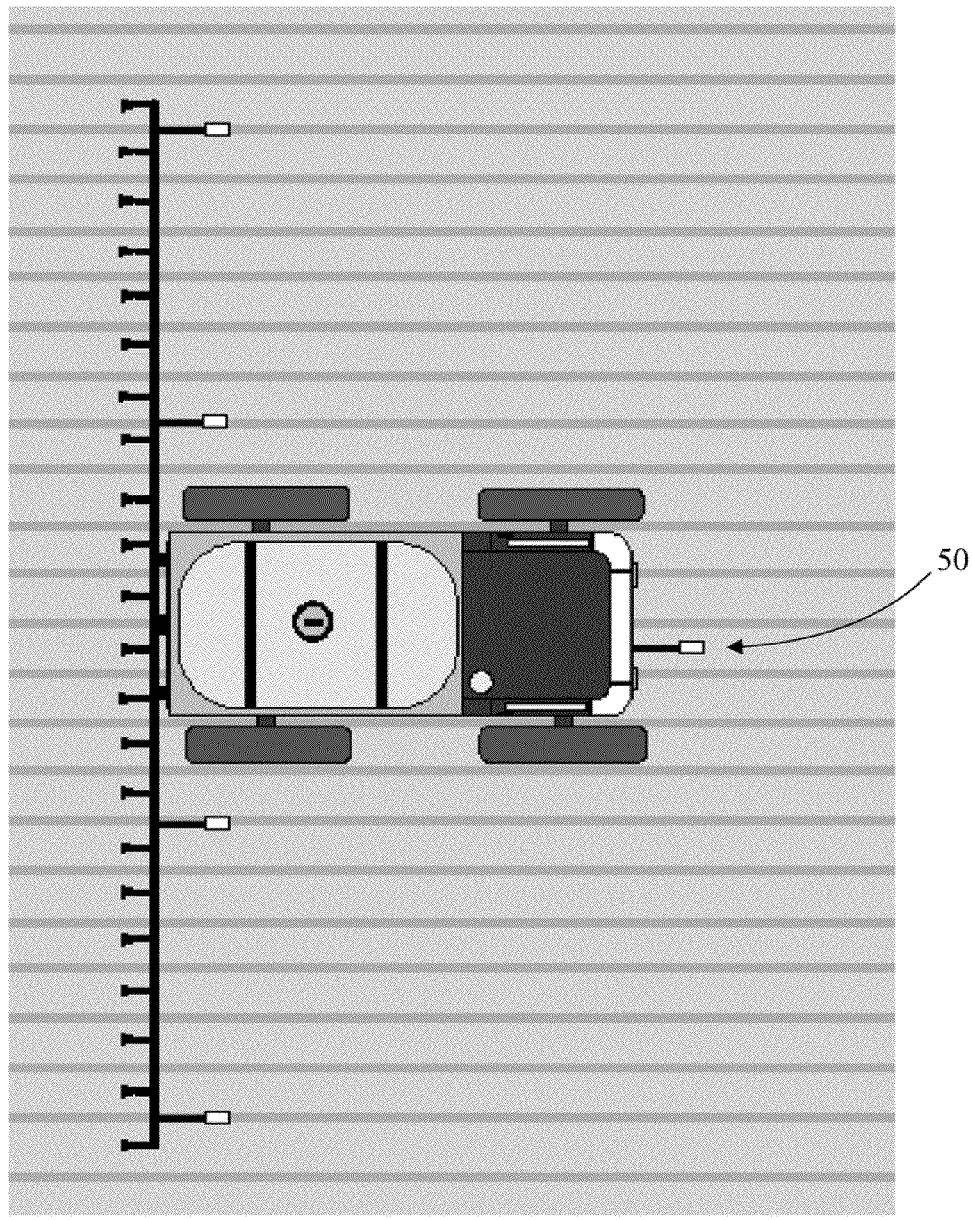
FIG. 7 illustrates sensor-based variable rate application utilizing random field sampling for sensor calibration and zone factor scaling.

Now consider the previous example but this time allowance for real-time zone factor adjustment of the application rate is performed with the use of a soil sensor 50 in FIG. 6. The VRA system is driven through the as was done in example 1 above in order to collect crop biomass information, see FIG. 7. After the crop data has been collected, VRA system changes to the application mode to apply material to the crop. Material application is now based on both crop sensor readings and soil sensor readings. In this example the soil sensor 50 is a reflectance sensor that produces an NDVI output that is proportional to soil color. The output of the soil sensor is fed into a look up table that will be used to generate values for the zone factor k. A typical look-up table may take on the form as shown in Table 4.

TABLE 4

Real-time zone factor look-up table based on soil NDVI measurements.

| Soil NDVI | Zone Factor, k |
|---|---|
| 0 < NDVI < 0.3 | 1.0 |
| 0.3 < NDVI < 0.35 | 0.87 |

TABLE 4-continued

Real-time zone factor look-up table based on soil NDVI measurements.

| Soil NDVI | Zone Factor, k |
|---|---|
| 0.35 < NDVI < 0.385 | 0.75 |
| 0.385 < NDVI < 0.41 | 0.5 |
| NDVI > 0.41 | 0.25 |

A similar table can be created for a pull-type, soil conductivity sensor or electromagnetic conductivity sensor. Also, the zone factors can be created from an existing NIR soil color photograph, yield map, etc. . . . and preprocessed using a personal computer. Preprocessed zone maps containing the zone factors can be loaded into the growers variable rate controller mounted in the tractor. This zone factor map will then be used in conjunction with the sensors, applicator controller and GPS when applying fertilizer. The new fertilizer application rate equation has the form:

$$S_{Rate} = k \cdot (100 + 100 \cdot \alpha) \quad (7)$$

where k is now incorporated in the rate equation to adjust for varying soil or field conditions.

Example 3

A grower decides to variably apply nitrogen to a field. His application system uses a generalized plant growth function that is parameterized in terms of sensor values and optimum nitrogen use and the system uses a growth stage appropriate plug value for an initial $VI_{Ref}$ calibration. His application system also incorporates the use an auto steer system to guide his vehicle through the field. The auto steer system will cause the applicator to maintain optimal sensor position over the crop rows. He decides that the optimal N rate to apply is 150 kg/ha on and that his maximum and minimum rates should be 250 and 100 kg/ha, respectively. Since he has already applied 50 kg/ha at planting, he sets his optimal N rate to 100 kg/ha. These parameters are loaded into the variable rate controller located inside his tractor. Next, the grower drives into the field and the applicator system starts to apply N to his crops. The controller will continually search for a better $VI_{Ref}$ value as he drives through the field since the system has been setup to auto calibrate in the background.

Options, Variations, and Alternatives

Therefore various embodiments of the present invention have been described. The present invention contemplates variations in the number and types of sensors (if used), variations in the algorithms or models used in determining variable application rates, and other variations, options, and alternatives. The present invention is not to be limited to the specific embodiments described herein, but only to that which falls within the spirit and scope of the claimed invention.

What is claimed is:

1. An apparatus for applying agrochemicals within a geographical area, the apparatus comprising:
   a dispensing system configured for dispensing the agrochemicals;
   a variable rate controller operatively connected to the dispensing system and configured to control dispensement of agrochemicals from the dispensing system;
   wherein the variable rate controller is programmed with an algorithm which uses a plant growth stage appropriate plug value for an initial calibration.

2. The apparatus of claim 1 further comprising an optical sensor operatively connected to the variable rate controller and adapted to measure a plant growth parameter.

3. The apparatus of claim 2 wherein the plant growth parameter comprises a vegetative index.

4. The apparatus of claim 3 wherein the variable rate controller is further programmed to analyze plant growth parameters at a plurality of locations within the geographical measuring with the sensor a plant growth parameter at a plurality of locations within the geographical area and generate a normalized response function for the geographical area.

5. The apparatus of claim 4 wherein the optical sensor is a color sensor.

6. The apparatus of claim 1 wherein the algorithm is a user downloadable algorithm.

7. The apparatus of claim 1 wherein the algorithm is a user definable algorithm.

8. The apparatus of claim 1 further comprising a GPS receiver operatively connected to the variable rate controller.

9. The apparatus of claim 8 wherein the variable rate controller is adapted to receive remote imagery acquired data.

10. The apparatus of claim 9 wherein the remote imagery acquired data comprises plant growth parameter measurements for the geographical area.

11. The apparatus of claim 1 further comprising a user interface operatively connected to the variable rate controller, the user interface adapted to receive a selection of the algorithm.

12. The apparatus of claim 1 wherein the variable rate controller is adapted to perform at least one additional field operation.

13. The apparatus of claim 12 wherein the at least one additional field operation comprises mapping.

14. The apparatus of claim 1 further comprising an inclinometer operatively connected to the variable rate controller, and wherein the variable rate controller uses an angle of incline measured with the inclinometer in controlling the dispensement of the agrochemicals.

15. A method for applying agrochemicals within a geographical area, the method comprising:
   acquiring a growth stage appropriate plug value for an initial calibration;
   using the growth state appropriate plug value in the initial calibration;
   applying agrochemicals to the geographical area according to the initial calibration.

16. The method of claim 15 further comprising passing an optical sensor over a part of the geographical area; measuring with the sensor a plant growth parameter at a plurality of locations within the geographical area; and analyzing the growth parameter measurements to generate a normalized response function for the geographical area.

17. The method of claim 15 wherein the step of acquiring comprises receiving from a user the growth stage appropriate plug value.

18. The method of claim 15 further comprising acquiring data from a sensor and analyzing the data to adjust application of the agrochemicals after the initial calibration.

19. The method of claim 17 wherein the sensor is a crop sensor.

20. The method of claim 17 wherein the sensor is an optical sensor.

21. The method of claim 17 wherein the sensor is an inclinometer.

22. The method of claim 17 wherein the sensor is a soil sensor.

23. The method of claim 22 wherein the soil sensor is one of an electromagnetic sensor, an electrochemical sensor, an optical sensor, and a force sensor.

24. The method of claim 15 further comprising mapping application of the agrochemicals within the geographical area.

25. The method of claim 15 wherein the method of acquiring the growth stage appropriate plug value for an initial calibration comprises acquiring the growth stage appropriate plug value from a hardcoded value in programming of a controller.

26. A method for calibrating a system for treating plants growing in a geographical area, the method comprising:
acquiring a growth stage appropriate plug value for an initial calibration;
passing an optical sensor over a part of the geographical area;
measuring with the sensor a plant growth parameter at a plurality of locations within the geographical area; and
analyzing the growth parameter measurements to generate a normalized response function for the geographical area.

27. The method of claim 26 further comprising comparing the growth stage appropriate plug value for the initial calibration to a calibration determined by analysis of the growth parameter measurements.

28. A system for treatment of crops, comprising:
means for providing spatially variable vegetation index data;
means for receiving optimum or economically optimum agrochemical rate data;
means for applying an agrochemical recommendation model to the spatially variable vegetation index data and the optimum or economically optimum agrochemical rate data to provide a recommended rate for treatment of crops.

29. The system of claim 28 wherein the means for providing spatially variable vegetation data comprises one or more real-time crop sensors.

30. The system of claim 28 wherein the means for providing spatially variable vegetation data further comprises one or more real-time soil color sensors.

31. The system of claim 28 wherein the means for providing spatially variable vegetation data comprises a remote sensing system for acquiring remote sensing data indicative of vegetation.

32. The system of claim 28 wherein the agrochemical recommendation model is an N recommendation model.

33. The system of claim 28 wherein the crop is a row crop.

34. The system of claim 33 wherein the row crop is selected from the set consisting of corn, soybeans, cotton, wheat, barley, oil seed rape, rice and sorghum.

35. A system for treatment of crops, comprising:
an agricultural machine;
an intelligent control operatively connected the agricultural machine;
an agrochemical recommendation model stored on a memory associated with the intelligent control; and
wherein the agrochemical recommendation model provides for determining a recommended rate for treatment of crops using spatially variable vegetation index data and optimum or economically optimum agrochemical rate data.

36. The system of claim 35 further comprising one or more real-time crop sensors operatively connected to the intelligent control for providing the vegetation data associated with the spatially variable vegetation index data.

37. A method for treatment of a crop, comprising:
receiving optimum or economically optimum agrochemical rate data;
receiving spatially variable vegetation index data;
applying an agrochemical recommendation model to determine an agrochemical recommendation for application of an agrochemical;
applying the agrochemical to the crop.

38. The method of claim 37 wherein the step of applying an agrochemical recommendation model is performed in real-time with applying the agrochemical.

39. The method of claim 37 wherein the agrochemical is nitrogen.

40. The method of claim 37 wherein the crop is a row crop.

41. The method of claim 37 wherein the row crop is selected from the set consisting of corn, soybeans, cotton, and sorghum.

* * * * *